Patented Oct. 31, 1922.

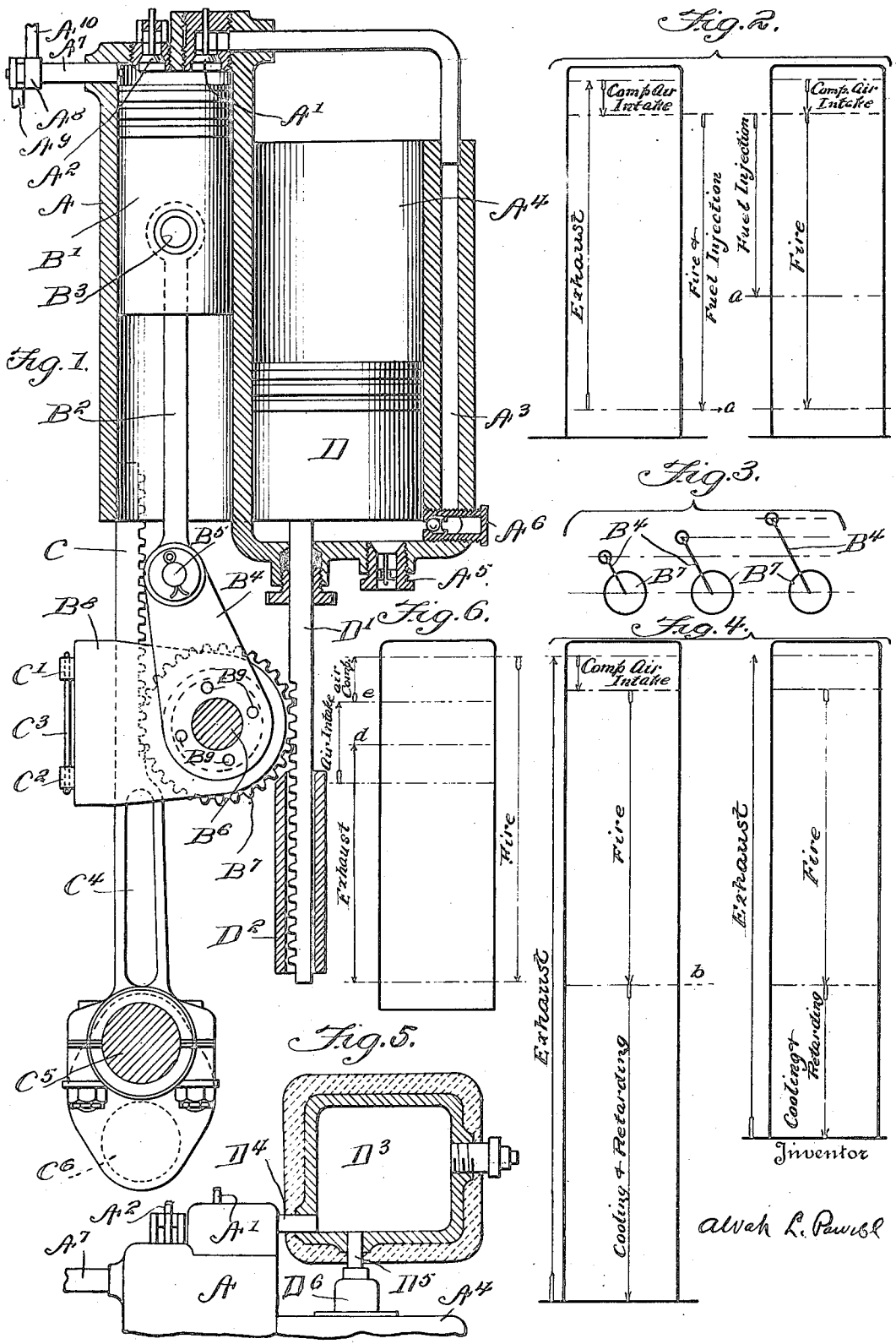

1,434,146

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

INTERNAL-COMBUSTION ENGINE.

Application filed December 8, 1920. Serial No. 429,166.

*To all whom it may concern:*

Be it known that ALVAH L. POWELL, citizen of the United States, residing at Miles City, in the county of Custer and State of Montana, has invented certain new and useful Improvements in Internal-Combustion Engines, of which the following is a specification.

My invention relates to improvements in internal combustion engines, and particularly of the class in which combustion is maintained either continuously through power stroke, or through any predetermined part of it, but by a novel construction and arrangement of the transmission member I am able to secure effects not otherwise obtainable. In engines of this type so far designed the working piston stroke has had a fixed relation to the crank stroke, but in the invention I shall describe there is a difference between them, and from this specific advantages are derived. These are greater flexibility, resulting from more perfect expansion; a greater possible range of limits between maximum and minimum power in the same engine; and possible retarding and cooling effects by which the speed of the engine may be lessened without sacrificing efficiency.

In the annexed drawings, Fig. 1 is a sectional elevation, showing the working parts of an engine equipped with my novel transmission member.

Fig. 2 is a diagram, indicating cyclic operation.

Fig. 3 is a diagram to illustrate possible changes in stroke from altering the lever members of the transmission mechanism.

Fig. 4 is a further diagram of cylinder operation.

Fig. 5 is a modification of the method of introducing the compressed charge.

Fig. 6 is a diagram to accompany Fig. 5.

In Fig. 1 the combustion cylinder, A, having on its upper end the inlet ($A^1$) and exhaust ($A^2$) valves, communicates through a by-pass, $A^3$, with a second cylinder, $A^4$. The latter may be separate or integral with the cylinder A, but as shown, it is integral.
At the closed end of cylinder $A^4$ is an inlet check valve $A^5$, while on the by-pass an outlet check valve is located, $A^6$. Near the end of cylinder A there is a pipe, $A^7$, communicating with a valve, $A^8$, through which the combustible fluid, or gas, is introduced to the expansion cylinder, A. The valve $A^8$ communicates with any fuel source, by a pipe, $A^9$, and with any compressed air source through a pipe $A^{10}$. In the cylinder A is fitted a piston, $B^1$, slidable therein. To the piston $B^1$ is attached a link-piston rod, $B^2$, by means of a wrist pin, $B^3$. The link $B^2$ is fitted to a crank lever, $B^4$, by means of a pin, $B^5$, carrying cotter pins, as shown. The crank lever $B^4$ is pivoted on a pin, $B^6$, mounted, preferably, in the frame of the engine. On the pin $B^6$ are also mounted a gear, $B^7$, and a guide member, $B^8$. The crank lever $B^4$ and gear $B^7$ are pinned together by the pins $B^9$, being rotatable together on $B^6$. The slide member will be called slide in the further description of the engine. The slide $B^8$ is formed of two struts that are pivoted on the pin $B^6$, one on each side of the gear, although only one appears in the drawing. These struts, or forks, are fastened to a suitable block, or liner, that presses against the back of a rack, C, which is thus held in position on three sides. The slide is fastened together, preferably, by tap bolts, $C^1$, $C^2$, as shown, the bolts being further secured by a cotter pin, $C^3$. The slide oscillates freely on pin $B^6$, changing its position to conform to the variations in angle incident to the movement of the crank, $C^5$, on the engine shaft, as shown, ($C^6$, dotted lines). The toothed portion or rack, of the crank rod meshes with the teeth of the gear $B^7$, with which it is always held in proper alignment by the movement of the oscillating slide, $B^8$.

In the cylinder $A^4$ is a piston, D, connected to a piston rod $D^1$, toothed along part of its length as shown, and fitting in a guide, $D^2$, preferably formed from a lug in the frame of the engine. The teeth on this piston rod mesh with the gear $B^7$, and it is evident, from the construction described, that the pistons $B^1$ and D will have a common movement as regards time of stroke, but in opposite directions.

The operation of the engine is as follows:

On the upstroke of piston $B^1$ the exhaust valve $A^2$ will be open, by the action of any suitable auxiliary means, not shown in drawing. In the meantime, the piston D is descending, compressing a charge of air previously drawn in through the check valve $A^5$. As the piston $B^1$ reaches end of stroke, the exhaust valve $A^2$ again opens, by the action of proper auxiliary means, not shown. What remains of a previously burnt charge is forced out as the piston returns. The exhaust valve closes and the inlet valve, A¹, opens and a charge of compressed air enters the cylinder A. As the piston starts on its downstroke the inlet valve closes and the fuel valve, A³, opens, a stream of fuel, either gas, vapor, or a prepared mixture of dry fuel and air (such as coal dust), entering the combustion chamber of the cylinder A. The temperature of the already compressed air is sufficient to cause ignition, and the pressure of the uncombined compressed air and burner gases is raised, or maintained, as the piston B¹ moves on its downward, or power, stroke. The inlet of combustible continues throughout any prearranged period; but in any case, it is cut off near end of outstroke. In the meantime, the piston D is moving vertically and during this part of its stroke it draws in a fresh charge of air through the valve A⁵, the check valve A⁶ cutting off the air chamber of A⁴ from the combustion chamber of cylinder A, the pressure of air and gas in cylinder A being greater than that of D, during the intake stroke of the latter.

On reversing, the piston B¹ moves upward and the valve A² opens, the burnt charge being forced out as the piston rises. The piston D starts to descend, at the same time, compresing a new air charge. It is evident that an impulse occurs at each downward stroke, and that the engine is of the two cycle type.

In Fig. 3 the diagram shows a cycle in detail, as already described. This may be altered, however, by a suitable arrangement of cams to operate, as shown in the diagrams of Fig. 2. In this, the exhaust would be for full back stroke, the inlet valve opening as the piston starts out, the new charge being cut off at a hypothetical point, a, Fig. 2.

It will be observed, by examining the drawing, that the strokes of the pistons vary as to length, that of B¹ being greater than that of D. The diameter of the cylinder A⁴ must be therefore greater than that of cylinder A, in order to assure equality by volume.

The crank lever B⁴ moves through a greater radius than the pitch radius of the gear B⁷. The crank C⁵ has a less movement than the piston. This differential relation makes it possible to modify the cycle as already described and, instead, to have one such as is indicated in diagram Fig. 4. In this the compressed charge enters for a small part of stroke, ignition takes place and continues to a pre-determined point, say, b, Fig. 4. This point will be less than the total stroke. On cut-off of ignition, a further expansion will ensue, but with pressure falling rapidly, the charge expanding with increasing cylinder volume. This will lead to a cooling effect, for the charge, as it expands, will absorb heat from piston and cylinder walls, the speed of the engine slackening. This arrangement will convert the piston into a cooling pump, for the time being; jointly with this will occur a retarding effect that will slow the engine for an average part of the stroke.

In Fig. 5 a modification of the two cycle type of engine is shown. The chamber D³ communicates with the cylinder A through a pipe, D⁴, and with cylinder A⁴ by a pipe, D⁵. The chamber D³ is covered, exteriorly, with any heat insulating material, in order to retain the heat of any compressed air or gas, that may be forced in it. On the compression stroke D the air will be forced into the retaining chamber, a check valve at D⁶ holding the pressure. The actuating means of the engine being properly adjusted, a cycle can be made as shown in diagram Fig. 6. In this the exhaust stops at d, the new charge starting to enter before this, helping to blow out the burnt gases. Exhaust cuts off and the charge inlet continues to e. Inlet then cuts off, and for the remainder of upstroke the charge is further compressed by the action of the piston.

The differential relation between piston stroke and crank stroke may be made whatever desired by changing the center B⁵ with reference to the pitch radius of gear B⁷, or vice versa. Diagram Fig. 3, indicates alterations that may be effected.

It is evident that many modifications in the operation of the internal combustion engine of the high compression, auto-ignition class are possible with the system I have described. The differential relation between piston stroke and crank stroke gives a wide range for such variations, while the exact structure herein given may be replaced by others, yet still remain within the limits of my invention.

What I believe is new, and ask to have protected by Letters Patent, is—

1. In an internal combustion engine, the combination of a power cylinder and a piston in said cylinder, an auxiliary cylinder and a piston in said cylinder, operable valves for controlling inlet of air and gas and for the outflow of a burned charge, a crank shaft, a differential transmission between said cylinders and crank shaft, means connecting the power piston with the differential transmission, means connecting the differential transmission with the crank shaft, and means for operating the auxiliary piston from the said differential transmission, substantially as described.

2. In an internal combustion engine, a power cylinder, a compressing cylinder, communicating means between said cylinders, valves controlling the flow of fluid through said means, pistons operable in said cylinders, a differential transmission member, connecting means from the piston of the compressing cylinder to said differential transmission member, means connecting the differential transmission member with the piston in the power cylinder for effecting a difference in the relative length of strokes of the said pistons, a crank shaft, and means for transmitting the power of the piston in the power cylinder through the differential transmission member to the crank shaft, substantially as described.

3. In an internal combustion engine, a power cylinder, an air compressing cylinder, communicating means between the cylinders, a compressed air storage tank interposed in said means, a valve for controlling the flow of compressed air through said means; operable valves for controlling the inlet of compressed air and fuel into the power cylinder and for the outflow of a burned charge from the cylinder, pistons operable in said cylinders, a crank shaft, a differential transmission member interposed between the crank shaft and pistons, and means operatively connecting the differential transmission with the pistons and crank shaft, substantially as described.

4. In an internal combustion engine, a power cylinder, an air compressing cylinder having a greater diameter than the power cylinder, oppositely moving pistons in said cylinders, communicating means between the cylinders, operable valves for controlling the inlet of air and fuel into the power cylinder and for the outlet of a burned charge from the power cylinder, a crank shaft, a connecting rod having a rack face carried by the crank shaft, a slide mounted upon the connecting rod, a pinion carried by the slide meshing with the rack face of the connecting rod, a lever having a greater length than the radius of the pinion, means detachably securing the lever at one end to the pinion whereby different length levers can be attached to the pinion, a piston rod carried by the piston in the power cylinder and connected to the outer end of the lever, a piston rod carried by the piston in the air compressing cylinder, and a rack face formed on the last mentioned rod meshing with the pinion, substantially as described.

In testimony whereof I affix my signature.

ALVAH L. POWELL.